United States Patent

Pitkjaan et al.

[11] 3,894,227
[45] July 8, 1975

[54] TRI-BEAM ROADWAY-LIGHTING SYSTEM FOR MOTOR VEHICLES

[75] Inventors: Elam Pitkjaan, Cedar Grove; Leland W. LeSeur, Cedar Knolls, both of N.J.

[73] Assignee: Westinghouse Electric Corporation, Pittsburgh, Pa.

[22] Filed: Oct. 10, 1974

[21] Appl. No.: 513,917

Related U.S. Application Data

[63] Continuation-in-part of Ser. No. 445,751, Feb. 25, 1974, abandoned.

[52] U.S. Cl.... 240/7.1 A; 240/41.35 R; 240/46.5 S; 315/83
[51] Int. Cl............................ B60g 1/00; B60g 3/00
[58] Field of Search............ 240/7.1, 7.1 A, 41.35 R; 315/82, 83

[56] References Cited
UNITED STATES PATENTS

| | | | |
|---|---|---|---|
| 1,686,859 | 10/1928 | Huntingdon | 315/83 |
| 1,964,562 | 6/1934 | Douglas | 315/83 |
| 2,011,677 | 8/1935 | Douglas | 315/83 |
| 2,037,863 | 4/1936 | Matha | 315/83 X |
| 2,170,682 | 8/1939 | Frech et al. | 240/41.35 X |
| 2,556,052 | 6/1951 | Adler, Jr. | 240/7.1 |
| 3,364,385 | 1/1968 | Yatcko | 315/83 |
| 3,373,311 | 3/1968 | Neulinger et al. | 315/83 |
| 3,553,520 | 1/1971 | Hicks | 240/41.35 R |
| 3,818,210 | 6/1974 | Pitkjaan | 240/7.1 |

FOREIGN PATENTS OR APPLICATIONS
198,744    6/1923    United Kingdom.......... 240/41.35 R

*Primary Examiner*—Richard M. Sheer
*Attorney, Agent, or Firm*—D. S. Buleza

[57] ABSTRACT

Four headlamps are mounted in paired relationship on the front of the vehicle and energized in various combinations (two, three and four-headlamp sequence) to provide a low-beam, a mid-beam and a high-beam lighting mode, respectively, each of which has a light distribution pattern that provides improved illumination of the roadway under various driving and traffic conditions with a minimum of glare. One lamp in each pair of headlamps contains dual light sources, one of which is used for the low-beam lighting mode and the other of which is used for the high-beam light mode. The remaining headlamp in each pair contains a single light source and one of these lamps serves as a mid-beam lamp that is energized with the two low-beam light sources to provide the mid-beam lighting mode. The other single-light source lamp constitutes a high-beam headlamp that is energized along with the mid-beam lamp and two high-beam light sources to provide the high-beam lighting mode.

16 Claims, 13 Drawing Figures

(LOW-BEAM LAMP)
FIG. 5A (MID-BEAM LAMP)
FIG. 5B (HIGH-BEAM LAMP
DUAL FILAMENT)
FIG. 5C (HIGH-BEAM LAMP
SINGLE FILAMENT)
FIG. 5D

TRI-BEAM ROADWAY-LIGHTING SYSTEM FOR MOTOR VEHICLES

CROSS-REFERENCES TO RELATED APPLICATIONS

This application is a continuation-in-part of application Ser. No. 445,751 filed Feb. 25, 1974, now abandoned.

The subject matter of this application is also related to and comprises an improvement over that disclosed and claimed in application Ser. No. 324,474 (Now U.S. Pat. No. 3,818,210) entitled "Vehicular Road-Lighting System Having a Headlamp With a Dual-Segment Reflector" filed Jan. 17, 1973 by Elam Pitkjaan and assigned to the assignee of the present application.

BACKGROUND OF THE INVENTION

1. Field of the Invention

This invention relates to the lighting art and has particular reference to an improved headlamp system for motor vehicles.

2. Description of the Prior Art

Roadway lighting systems for motor vehicles employing various combinations and types of headlamps are well known in the art. A tri-beam headlamp system utilizing four sealed-beam lamps each of which have a single filament and are selectively energized in 2-3-4 sequence to provide three different lighting patterns is disclosed in U.S. Pat. No. 3,373,311 issued Mar. 12, 1968 to K.H. Neulinger et al. In an alternative embodiment of the patented invention, three single-filament lamps and one dual-filament lamp are operated in 3-3-4 sequence to provide the three beams.

A tri-beam headlighting system employing one pair of dual-filament headlamps and one pair of single-filament headlamps that are energized in 2-2-4 sequence is disclosed in U.S. Pat. No. 3,364,385 issued Jan. 16, 1968 to P. J. Yatcko.

A tri-beam headlamp system employing four sealed-beam headlamps each of which contains a single filament and one of which has a dual-segment reflector component and a vertically-fluted lens (with the lamps operated in 2-3-4 sequence) is disclosed and claimed in the aforementioned application Ser. No. 324,474 of Elam Pitkjaan (U.S. Pat. No. 3,818,210).

While the prior art headlamp systems were generally satisfactory from an engineering standpoint, better illumination of the roadway under the various driving conditions encountered in city and rual driving and on highspeed turnpikes would be very desirable. It would accordingly be advantageous from a safety and functional standpoint to provide a headlighting system for motor vehicles which would increase the illumination and visibility of signs and critical areas of the roadway without causing hazardous glare light that would blind preceding and oncoming drivers.

SUMMARY OF THE INVENTION

Briefly, the aforesaid objectives are achieved in accordance with a preferred embodiment of the present invention by combining two dual-filament sealed-beam headlamps with two single-filament sealed-beamed headlamps and energizing the lamps in a 2-3-4 sequence to provide three lighting modes of different intensities and beam patterns—namely, a low-beam mode wherein two filaments in two of the headlamps are energized, a mid-beam mode wherein three filaments in three of the headlamps are energized, and a high-beam mode wherein four filaments (one in each of the four headlamps) are energized.

The headlamps are mounted in paired relationship on the front of the vehicle and one headlamp in each pair is of dual-filament construction. The remaining headlamp in one pair is a single-filament high-beam lamp and the remaining headlamp in the other pair is a single-filament mid-beam lamp. The mid-beam headlamp preferably has a dual-segment reflector that provides a composite beam of light which supplements the light from the two low-beam filaments and produces a mid-beam having a light distribution pattern of enhanced intensity that can be used on multi-lane highways without causing hazardous glare to other drivers. All of the headlamps have conventional prismatic type lenses that cooperate with the respective filaments to produce the desired beam patterns for each of the lighting modes.

In an alternative embodiment the mid-beam headlamp has a vertically-fluted lens with no prisms or horizontal risers and it can also employ a conventional parabolic type reflector.

BRIEF DESCRIPTION OF THE DRAWINGS

A better understanding of the invention will be obtained from the exemplary embodiments shown in the accompanying drawings, wherein.

DESCRIPTION OF THE PREFERRED EMBODIMENT

Figure 1:
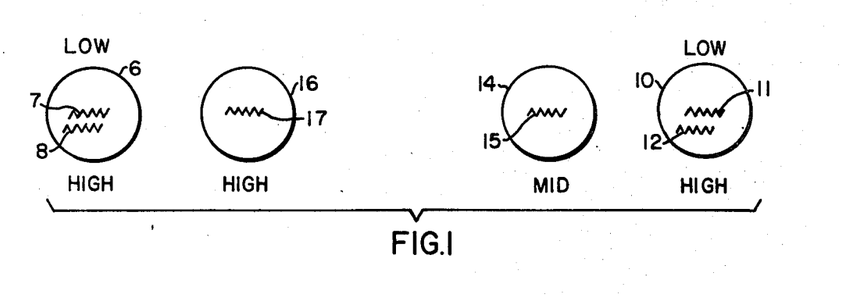
FIG. 1 is a schematic representation of the improved tri-beam headlighting system for motor vehicles according to the present invention.

As shown in FIG. 1, the improved headlighting system of the present invention consists of four headlamps 6, 10, 14 and 16—two of which contain a pair of light sources and two of which contain a single light source. The headlamps are mounted in paired relationship on the front of the motor vehicle and are disposed so that a pair of headlamps are located on each side of the centerline of the vehicle. Headlamp 6 contains a suitable light source, such as a coiled filament 7, that is positioned in "on-focus" relationship with the parabolic reflector component of the lamp. Headlamp 6 also contains a second suitable light source, such as another coiled filament 8, which is located in "off-focus" relationship with the reflector (below and slightly to the left of filament 7 as viewed from the front of the headlamp). An apertured shield (of the type shown in the mid-beam headlamp describd below) is mounted in front of the filaments 7 and 8 and oriented in a manner such that it masks and intercepts direct light rays from filament 7 but does not mask filament 8. Direct rays from the energized on-focus filament 7 and resulting glare light above the horizontal axis are thus eliminated.

Filaments 7 and 8 are preferably C-6 type filaments of coiled tungsten wire (or other suitable refractory metal) that are mounted in substantially horizontal position within the headlamp 6 when the latter is mounted in its position of use on the vehicle. The shielded on-focus filament 7 constitutes a low-beam filament and the unshielded off-focus filament 8 constitutes a high-beam filament. Headlamp 6 thus constitutes a dual-function lamp.

Headlamp 10 on the opposite side of the vehicle is also a dual-function lamp insofar as it contains a shielded on-focus low-beam light source, such as a coiled filament 11, and an unshielded off-focus high-beam light source, such as another coiled filament 12. The dual-function headlamps 6 and 10 are thus of identical construction in that they each contain a pair of light sources and an apertured filament-shield. They are both of sealed-beam construction and preferably comprise PAR 46 type headlamps (5¾ inches or 145 mm. in diameter) that have conventional reflectorized pressed-glass components of parabolic configuration which are heremetically sealed along their peripheries to glass lenses that are provided with a light-bending prisms formed by horizontal risers and vertical flutes molded into their inner surfaces.

Dual-function headlamp 10 is paired with a mid-beam headlamp 14 (preferably a PAR 46 size) that has a prismatic type lens and contains a single light source, such as a coiled filament 15 of the C-6 type, which is located in on-focus relationship with the concave reflector component of the lamp and is masked by a suitable shield. In contrast to all of the other headlamps in the system, the mid-beam headlamp 14 preferably has a split or dual-segment reflector of the type disclosed in U.S. Pat. No. 3,688,149 (issued Aug. 29, 1972 to Elam Pitkjaan) wherein an integral or one-piece reflector of vitreous material is divided into two hemiparabolic segments that are axially offset from one another to form a step or ledge that extends horizontally across the inner surface of the reflector member. The structural features of the preferred "split" reflector mid-beam headlamp 14 are shown in FIGS. 2-4 and will be described in detail hereinafter.

Returning to FIG. 1, the dual-function headlamp 6 on the other side of the vehicle is paired with a high-beam headlamp 16 of sealed-beam construction (preferably a PAR 46 lamp) that contains a single light source, such as a C-6 type filament 17, which is disposed in on-focus relationship with a conventional parabolic reflector component. High-beam headlamp 16 (in contrast to all of the other headlamps 6, 10 and 14) does not contain a shield since all of its light rays are intended to be directed straight down the roadway in front of the vehicle in order to provide maximum illumination for high-speed driving on express highways and the like where glare light does not constitute a serious problem. High-beam headlamp 16 has a prismatic type lens with conventional vertically-extending flutes and horizontal risers which bend the light rays and concentrate them into a compact beam of the desired configuration in the well known manner. Since both of the dual-function headlamps 6 and 10 and the mid-beam lamp 14 also have such prismatic type lenses, all of the lamps are provided with this type lens according to this embodiment of the invention.

In a preferred embodiment designed for use with a motor vehicle having a 12 volt battery, the low-beam filaments 7 and 11 in the dual-function headlamps 6 and 10 each have a nominal rating of 60 watts and the high-beam filaments 8 and 12 have a nominal rating of 50 watts. The single filament 15 in the mid-beam headlamp 14 has a nominal rating of 50 watts and the single filament 17 in the high-beam headlamp 16 has a nominal rating of 60 watts.

Figure 2:
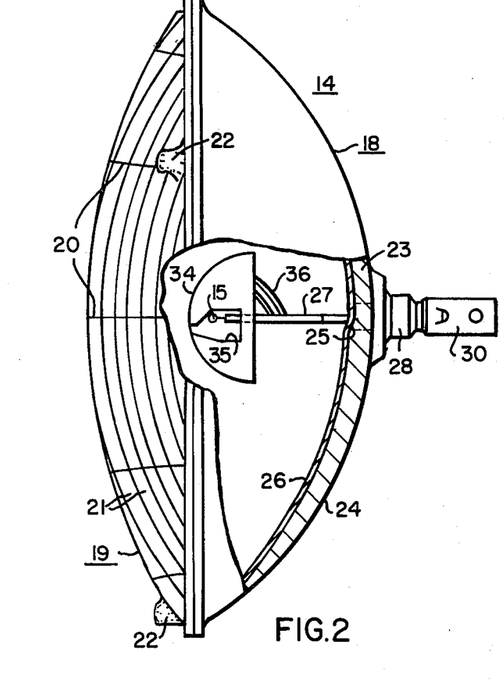
FIGS. 2 and 3 are side elevational and plan views, respectively, of the preferred type of mid-beam headlamp employed in the roadway-lighting system shown in FIG. 1.
Figure 3:
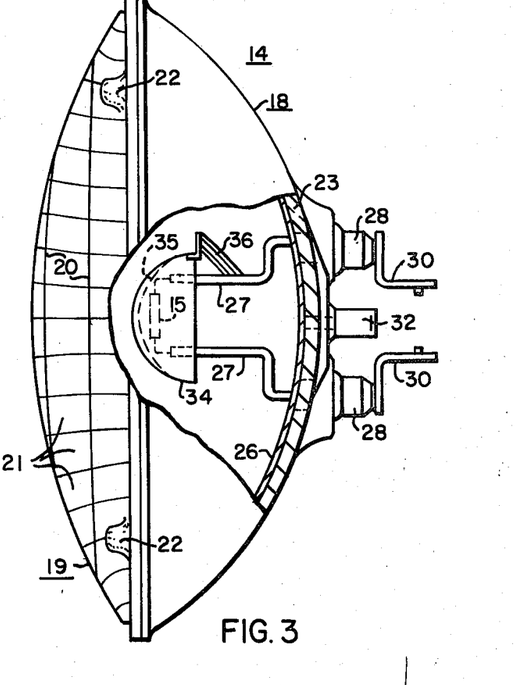
Figure 4:
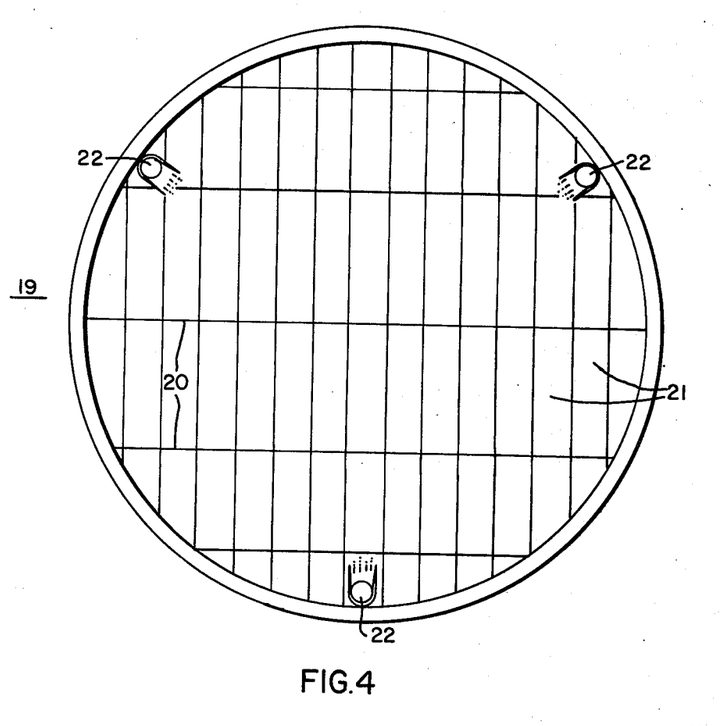
FIG. 4 is a plan view of the prismatic type lens used in the mid-beam headlamp shown in FIGS. 2 and 3.

MID-BEAM HEADLAMP (FIGS. 2-4)

The structural features of the preferred mid-beam headlamp 14 will now be described. As shown in FIGS. 2 and 3, this lamp is of the sealed-beam type and thus has an envelope which consists of a glass reflector component 18 that is hermetically sealed along its periphery to a glass lens 19 that has a series of horizontally-extending risers 20 and vertically-extending flutes 21 molded into its inner surface. The combination of these risers and flutes provide a series of light-bending prisms on the inner surface of the lens 19 that direct the light rays into the desired pattern, as is well known to those skilled in the art. The lens 19 also has outwardly-protruding nipples or pads 22 molded into its outer surface adjacent the lens periphery. Three such pads 22 are employed and (as shown in FIG. 4) they are circumferentially spaced from each other approximately equal distances. The outer surfaces of the pads 22 are located in precise spatial relationship with the lamp filament 15 and permit the headlamp 14 to be properly aimed by mechanical means when the headlamp is mounted on the vehicle. Such mechanical aiming is well known in the art and headlamps of this type and apparatus for aiming them are described in U.S. Pat. Nos. 2,831,262 and 2,870,362.

As will be noted in FIGS. 2 and 3, the glass reflector component 18 of the mid-beam headlamp 14 is divided into a pair of hemiparabolic segments 23 and 24 that are axially offset relative to one another so that the bottom segment 24 is positioned slightly in front of the top segment 23 and is joined to the latter along a ledge 25 that extends horizontally across the inner surface of the reflector. The foci of the two reflector segments are spaced from one another along the optical axis of the reflector 18. The inner surface of the reflector 18 is coated with a thin layer 26 of aluminum or the like which provides a specular reflective surface. The filament 15 is supported between the foci of the two offset reflector segments by a pair of lead wires 27 that extend through spaced openings in the back of the reflector 18 and are electrically connected, as by brazing, to a pair of metal ferrules 28 that are hermetically sealed to bosses molded into the outer surface of the reflector. L-shaped metal terminals 30 are fastened to the ferrules 28 to provide a blade-like connector arrangement which permits the headlamp 14 to be inserted into a suitable socket mounted on the vehicle.

The envelope formed by the reflector 18 and lens 19 is evacuated and filled with a suitable inert gas, such as a mixture of argon and nitrogen, through a tubulation 32 (FIG. 3) in the usual fashion, after which the tubulation is tipped off.

The filament 15 consists of a helical coil of tungsten wire that is disposed in horizontal position within the headlamp 14 (C-6 filament configuration) and is masked by a concave shield 34 of suitable sheet metal such as steel that is suspended in front of the filament 15 by a strap 36 that extends from the shield and is fastened as by spot welding to one of the lead wires 27. The shield 34 may be provided with an aperture 35 of such size and location that the shield intercepts direct light rays from the filament 15 which would otherwise pass through the lens 19 and produce glare light that would disturb or "blind" the drivers of preceding and on-coming vehicles. Alternatively, shield 34 can be of solid construction with no aperture. However, an apertured shield is preferred since this type shield is also required in the dual-function lamps 6 and 10 and a standard shield rather two different types can thus be used in manufacturing the lamps.

LIGHT-DISTRIBUTION PATTERNS (FIG. 5)

The combination of light sources, reflector and lens components and shields employed in the various headlamps of the improved headlighting system are such that the lamps provide beam patterns of precisely controlled configuration and intensity. This is apparent from the isocandela diagrams or light distribution patterns of the individual headlamps depicted in FIGS. 5A to 5D. As will be noted from FIG. 5A, the shielded low-beam filaments 7 and 11 in the dual-function headlamps 6 and 10, respectively, each provide a concentrated beam of light that is located below the horizontal axis H—H and to the right of the vertical axis V—V.

Figure 5A:
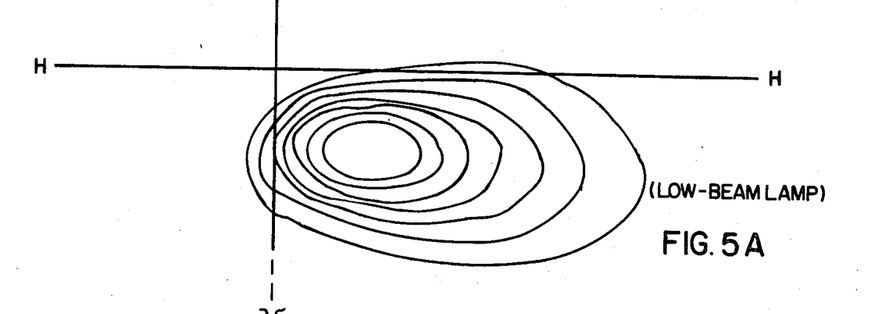
FIGS. 5A through 5D are isocandela diagrams illustrating the beam patterns produced by the low-beam, mid-beam, high-beam (dual filament), and high-beam (single filament) headlamps, respectively, according to the invention.
Figure 5B:
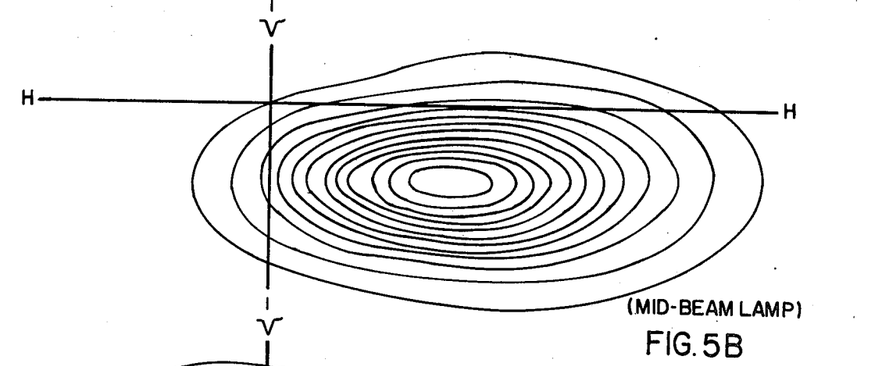
Figure 5C:
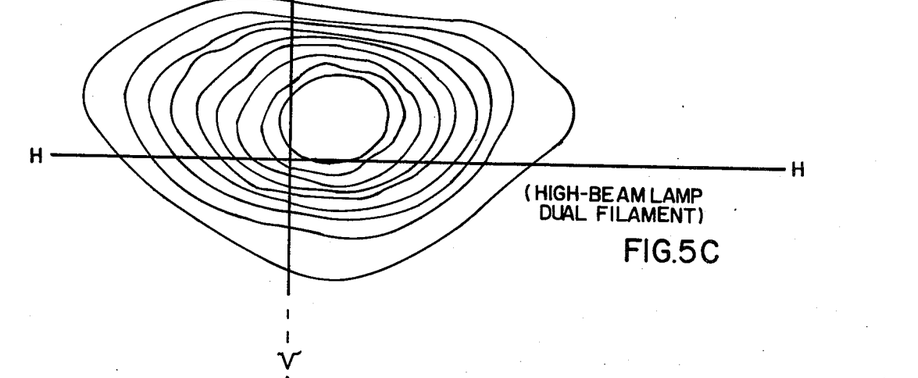
Figure 5D:
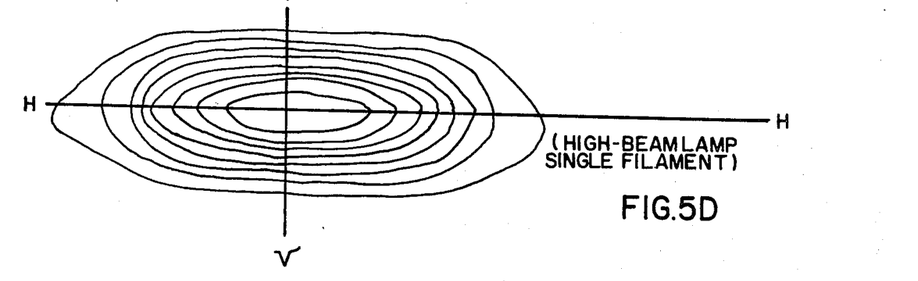

The light beam provided by the shielded filament 15 of the mid-beam headlamp 14 is shown in FIG. 5B and, while of greater intensity than the low beam, it is also positioned to the right of the vertical axis V—V and almost entirely below the horizontal axis H—H. This downward "throw" of the light rays is achieved by tilting the reflector 18 of headlamp 14 downwardly 3° from the horizontal.

In contract, the beam pattern (shown in FIG. 5C) produced by each of the unshielded high-beam filaments 8 and 12 of the dual-function headlamps 6 and 10, respectively, is centered slightly to the right and slightly above the intersection of the vertical axis V—V and horizontal axis H—H. However, the beam is quite compact and is sharply defined so that the region of greatest intensity is located on the right side of the vehicle.

The beam pattern (FIG. 5D) produced by the unshielded filament 17 of the high-beam lamp 16 is centered relative to the vertical and horizontal axes and is thus aimed directly down the roadway in front of the vehicle. However, it also has sharply-defined boundaries and, in addition, is spread or elongated in a horizontal direction.

In accordance with the present invention, the desired three different lighting modes are achieved by blending the individual light beams of headlamps 6, 10, 14 and 16 in a predetermined manner. Specifically, this is accomplished by energizing two of the headlamps in such a manner that they provide a low-beam lighting mode, energizing three of the headlamps to provide a mid-beam lighting mode and then all four headlamps to provide a high-beam lighting mode—that is, by operating the lamps in a 2-3-4 sequence. The blending of the light beams produced by the various combinations of energized headlamps is such that the illumination of the roadway is increased and the "seeing distance" in the lane immediately in front of the vehicle is extended without producing excessive or hazardous glare for either on-coming or immediately preceding drivers. This increase in beam intensity without causing hazardous glare light is achieved by optimizing the distribution of the light intensity in all three of the lighting modes and by employing a mid-beam headlamp 14 which adds its sharply-defined high-intensity beam pattern to the beam pattern provided by the two low-beam filaments 7 and 11 (or to the beam patterns provided by the high-beam filaments 8, 12 and 17).

In the low-beam lighting mode, the two shielded low-beam filaments 7 and 11 in the outboard headlamps 6 and 10 are energized to produce a low-beam light pattern of increased intensity and higher light output that is aimed just below the horizontal axis and to the right of the vertical axis. This beam pattern increases the "seeing" distance in front of the vehicle and also provides better visibility of objects and signs that are encountered along the roadway on standard two-lane roads and highways. The glare level in this mode is about the same as that produced by conventional low-beam headlamp systems now in use which provide a beam pattern of lower intensity.

IN the mid-beam lighting mode, the two shielded low-beam filaments 7 and 11 in the outboard headlamps 6 and 10 are energized along with the shielded filament 15 of the inboard mid-beam headlamp 14. The light from the mid-beam headlamp 14 supplements that produced by the low-beam filaments and provides increased seeing distance on multiplane divided highways and even on rural roads, particularly in situations where objects of low reflectivity are encountered along the roadway. The mid-beam lighting mode is advantageous in that it can be used effectively in situations where the high-beam headlamps now in use would cause excessive and intolerable glare to other drivers. The mid-beam lighting mode provides bean intensity values at the horizontal and below the horizontal to the right of the centerline of the vehicle which are higher than those produced by conventional headlighting systems now in use. Thus, sign and obstacle luminance values are proportionally increased. Lane overhead signs are also more easily seen since the combined beam intensity of the three energized headlamps 6, 10 and 14 exceeds that of the low-beam mode where only the two outboard headlamps are energized.

The improved beam pattern in the mid-beam lighting mode is principally derived from the use of the dual-segment type reflector 18 in the mid-beam headlamp 14 which produces two superimposed beams of light of almost equal intensity. This latter phenomenon is achieved through the geometrical transverse placement of the filament 15 with respect to the two foci of the offset reflector segments 23, 24 and the optical manipulation of the two independent beam divergencies from the respective reflector segments. Light source glare is reduced by the use of the internal shield 34 and a suitable prismatic type lens 19. Ths combination of an internal shield, a prismatic lens and a split-reflector produces sharply-defined horizontal and vertical cut-offs in the mid-beam pattern which makes it possible to direct a maximum of light down the roadway in front of the vehicle without causing direct glare approaching or preceding traffic.

The high-beam lighting mode is achieved by energizing the shielded filament 15 of the mid-beam headlamp 14 and the unshielded filament 17 of the high-beam lamp 16 in conjunction with the unshielded high-beam filaments 8 and 12 of the two dual-function headlamps 6 and 10, respectively. The combined beam patterns of all four lamps provide increased beam intensity levels at selected portions of the overall beam pattern with the net result that road illumination is increased for high-speed driving conditions when obstacles of low reflective values are located along the side of the road. Marked improvement over the prior art high-beam lighting system is accomplished by the well-defined higher intensity and rounded spot-like beams that are produced by the "fill-in" high-beam patterns of the dual-filament outboard headlamps 6 and 10.

The improved vehicular-headlamp system of the present invention can thus be characterized as a 2-3-4 tri-beam system in which a pair of dual-filament headlamps are combined with a pair of single-filament headlamps and two of the headlamps are energized to provide a low-beam lighting mode, three of the headlamps are energized to provide a mid-beam mode and four of the headlamps are energized to provide a high beam mode.

HEADLAMP OPERATING CIRCUIT

Figure 6:
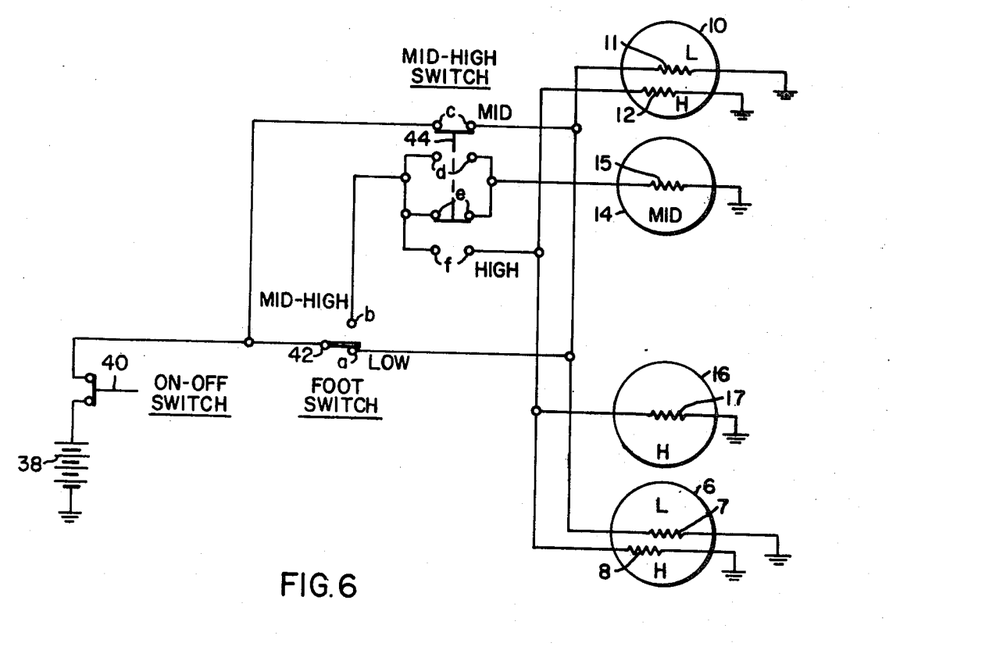
FIG. 6 is a circuit diagram showing the energizing circuit and switches for selectively operating the four headlamps and filaments in the various combinations required to provide the desired three different lighting modes.

The energizing and switching circuit employed to selectively operate the four headlamps in the aforesaid sequence and obtain the three different lighting modes is shown schematically in FIG. 6. As will be noted, the headlamp system is connected and disconnected from the electrical power supply or battery 38 of the vehicle by a hand-operated ON-OFF 40 that is mounted on the instrument panel. Selection of either the low-beam lighting mode or the mid-high modes is accomplished by a two-pole two-position foot-operated "dimmer" switch 42 which is located on the floor of the vehicle on the driver side. When the switch 42 engages contact *a* only the low-beam filaments 7 and 11 of the dual-function headlamps 6 and 10, respectively, are energized and the low-beam lighting mode is thus obtained.

When the foot switch 42 is operated to engage the other contact *b* and the ON-OFF switch 40 is closed, then the battery 38 is connected to a four-pole two-position MID-HIGH switch 44 that is also mounted on the instrument panel and engages either one set of contacts *c-e* or another set of contacts *d-f*. Switch 44 is shown in the mid-beam lighting position (MID) in engagement with contact *c-e*, thus energizing both of the low-beam filaments 7 and 11 of the dual-function headlamps 6 and 10 as well as filament 15 of the mid-beam headlamp 14. Three of the four headlamps are thus energized when the switches are in the above-described positions.

When the MID-HIGH switch 44 is moved into its high-beam position (HIGH), it engages the other set of contacts *d-f*, thus deenergizing the low-beam filaments 7 and 11 and energizing the high-beam filaments 8 and 12 of the dual-function headlamps 6 and 10 as well as the filament 17 of the high-beam headlamp 16. Filament 15 of the mid-beam headlamp 14 remains energized. All four headlamps are thus energized when the switches are in these positions.

The various switching arrangements for the three different lighting modes are summarized in Table I below, , 160

The increased illumination levels provided by the tri-beam headlighting system of the present invention improves the driver's visibility in each of the three different lighting modes. The provision of the mid-beam mode gives the driver much greater flexibility with respect to beam selection and better equips him to handle the wide variety of visual tasks he will encounter while driving on different kinds of roads and highways under different weather conditions.

In view of the safeguards and accuracy afforded by mechanical aiming techniques, the preferred headlamp system employs headlamps that are all provided with aiming pads of the type described above in connection with mid-beam lamp 14. The preferred system also employs a mid-beam headlamp that has a dual-segment reflector component since this feature provides the brightest mid-beam and high-beam lighting patterns.

Figure 7:
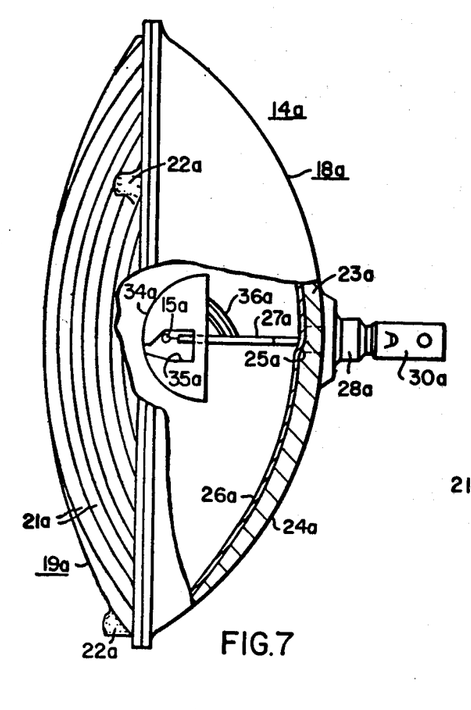
FIGS. 7 and 8 are side elevational and plan views, respectively, of an alternative mid-beam headlamp embodiment.
Figure 8:
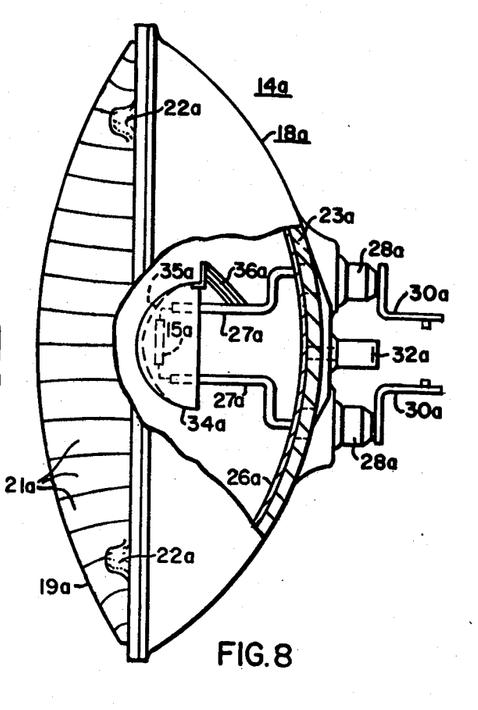
Figure 9:
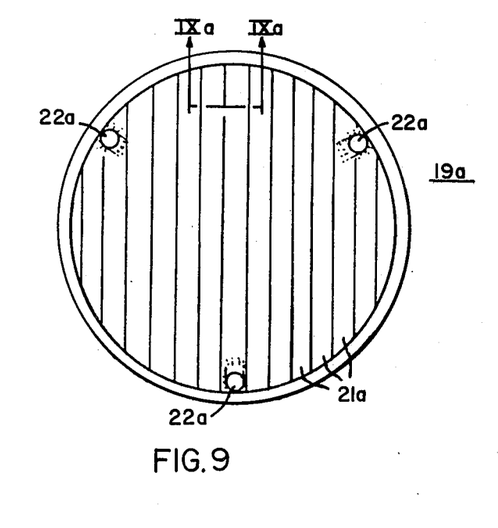
FIG. 9 is a front elevational view, on a reduced scale, of the vertically-fluted lens component used in the mid-beam headlamp shown in FIGS. 7 and 8.

ALTERNATIVE MID-BEAM HEADLAMPS (FIGS. 7–9)

An alternative type of mid-beam headlamp 14*a* is shown in FIGS. 7 and 8. As will be noted, headlamp 14*a* has the same type of split reflector 18*a* with offset hemiparabolic segments 23*a* and 24*a*, filament 15*a* shield 34*a*, etc. as headlamp 14 and is constructed in exactly the same manner except that its lens 19*a* is devoid of any prisms and horizontal risers and is thus provided with a series of flutes 21*a* that are molded into the inner surface of the lens. As illustrated in FIG. 9, the flutes 21a extend completely across the lens 19*a* in a vertical direction (when the lamp 14*a* is mounted in its position of use on the vehicle). The lens 19*a* has three spaced aiming-pads 22*a* of the same type as those described in connection with lamp 14.

Figure 9A:
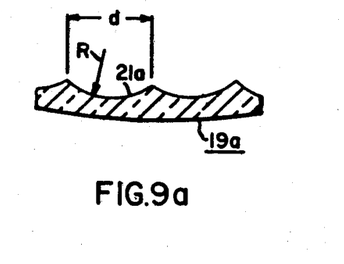
FIG. 9a is an enlarged fragmentary cross-sectional view of a portion of the vertically-fluted lens, taken along the line IXa—IXa of FIG. 9.

As shown in FIG. 9*a*, the vertical flutes 21a are of uniform width (dimension *d*) and of a arcuate cross-section with a predetermined radius of curvature R. In order to obtain the desired litht pattern with the C-6 type filament 15*a* shown, a 4° lateral spread of the light rays passing through the individual flutes is required. This lateral spread was achieved (in the case of the PAR 46 type headlamp and C-6 filament referred to) by using flutes that had a width of approximately 6mm. and a radius of curvature of approximately 27 mm.

Mid-beam headlamp 14*a*, when combined with dual-function headlamps and a high-beam headlamp of the type previously described (conventional parabolic reflectors and prismatic type lenses with aiming pads), provides an alternative headlighting system that can be aimed by either mechanical means or visually (that is, with the use of a screen placed in front of the car and suitable light meters). This provides a "universally-aimable" system which produces low, mid and high-beam lighting modes of substantially the same intensity and character as those described previously.

In order to make mid-beam headlamp 14*a* compatible with this universally-aimable system, the downward tilt of reflector 18*a* is decreased from 3° to approximately 1½°.

OTHER ALTERNATIVE EMBODIMENTS

While the headlamps have been described as being of the sealed-beam construction, it is within the scope of the invention to employ headlamps that contain halogen-cycle incandescent lamps (or other types of lamps) that are enclosed by a housing consisting of a reflector component that has a removably attached lens. In the case of the singlelight source mid-beam lamp 15 and high-beam lamp 16, a tubular halogen-cycle lamp that is mounted within the reflector-lens housing so that its filament extends horizontally along the focal plane of the reflector can be employed. In the dual light-source headlamps 6 and 10, either a single dual-filament halogen-cycle lamp or a pair of single-filament halogen-cycle lamps can be employed and mounted within the reflector-lens housing in a suitable manner so that one of the filaments is aligned with the focal point of the associated reflectors and other filament is oriented in off-focus relationship with the reflector.

Of course, the same alternative kinds of light sources can be used in lamps that are of sealed-beam construction and have lens and reflector components that are heremetically sealed to one another. The reflector and lens components can also be of rectangular or other configuration instead of having circular rims.

It is also within the scope of the present invention to provide a headlighting system having lamps which contain the combination of light sources described above and are all provided with conventional prismatic type lenses and conventional parabolic reflector components, with or without aiming pads.

An alternative universally-aimable roadway-lighting system can also be provided by employing a mid-beam headlamp that has a conventional parabolic reflector and a vertically-fluted lens with aiming pads, and combining it with two dual-function lamps and a high-beam lamp— all of which have conventional prismatic type lenses (with aiming pads) and conventional parabolic reflectors.

We claim as our invention:

1. A tri-beam roadway-lighting system for a motor vehicle comprising, in combination;
    four headlamps mounted on the front of the motor vehicle with a pair of headlamps disposed on each side of the centerline thereof,
    one headlamp in each of said pairs of headlamps comprising a dual-function headlamp having a lens, a reflector with a focal point, and a pair of light sources one of which is disposed in on-focus relationship and the other of which is disposed on off-focus relationship with said reflector, said on-focus light sources when energized producing low-beam illumination and a low-beam lighting mode,
    another headlamp in either one of said pairs of headlamps comprising a mid-beam headlamp having a lens, a reflector with a focal point, a single compact light source which is positioned adjacent said focal point, and a shield that is disposed in front of and in masking relationship with said compact light source, said mid-beam headlamp when energized producing a beam of light which supplements the low-beam illumination produced by said on-focus light sources and thereby provides a mid-beam lighting mode,
    the remaining headlamp in said pairs of headlamps comprising a high-beam headlamp that has a lens, a reflector with a focal point, and a single on-focus light source which, when energized in conjunction with said mid--beam headlamp and the off-focus light sources in said dual-function headlamps, produces a high-beam mode of illumination, and
    circuit means for energizing said headlamps and light sources in the aforesaid sequence including (a) a main two-position switch operable in one position to connect only the two on-focus light sources in said dual-function headlamps to the electrical power supply of the vehicle and thereby providing said low-beam lighting mode, and (b) an auxiliary two-position switch operable in one position to connect the mid-beam headlamp to the two on-focus light sources in the dual-function headlamps, said auxiliary switch in its other position being operable to connect the two off-focus light sources in said dual-function headlamps to the light sources in said mid-beam and high-beam headlamps,
    said main switch in its other position being operable to connect said auxiliary switch to the electrical power supply of the vehicle.

2. The vehicular tri-beam headlighting system of claim 1 wherein each of said reflectors is of generally paraboloidal configuration.

3. The vehicular tri-beam headlighting system of claim 2 wherein;
    both of said dual-function headlamps and said high-beam headlamp have prismatic type lenses, and
    said mid-beam headlamp has a lens with flutes that extend across the lens in a vertical direction and constitute the sole light-modifying means associated with said lens.

4. The tri-beam headlighting system of claim 3 wherein each of said lenses have a plurality of spaced projecting elements on their outer surfaces which are oriented to permit the respective headlamps to be aimed by mechanical means.

5. The vehicular tri-beam headlighting system of claim 1 wherein each of said lenses is of the prismatic type and have a plurality of spaced projections on their outer surfaces oriented to permit the headlamps to be aimed by mechanical means.

6. The vehicular tri-beam headlighting system of claim 1 wherein the light sources in said mid-beam headlamp and said high-beam headlamp both comprise halogen incandescent lamps.

7. The vehicular tri-beam headlighting system of claim 6 wherein the pair of light sources in each of said dual-function headlamps comprise a pair of filaments that are sealed in a halogen-containing envelope.

8. The vehicular tri-beam headlighting system of claim 1 wherein each of the dual-function headlamps also contain a shield that is disposed in front of and in making relationship with the on-focus light sources in the respective headlamps.

9. The vehicular tri-beam headlight system of claim 1 wherein;
    each of said headlamps is of the sealed-beam type,
    the light source in said high-beam headlamp and the two on-focus light sources in said dual-function headlamps each have substantially the same nominal wattage rating, and
    the light source in said mid-beam headlamp and the two off-focus light sources in said dual-function headlamps have nominal wattage ratings that are substantially the same but lower than the nominal wattage rating of the light source in said high-beam headlamp.

10. The vehicular tri-beam headlighting system of claim 9 wherein the light sources in each of said sealed-beam headlamps comprise coiled refractory wire filaments.

11. The vehicular tri-beam headlighting system of claim 9 wherein each of said sealed-beam headlamps are of the PAR 46 type and each of said light sources comprise coiled filaments of the C-6 type.

12. The vehicular tri-beam headlighting system of claim 1 wherein;
the reflector of said mid-beam headlamp is divided into two hemiparabolic segments which are axially offset relative to one another and have focal points that are apaced from one another along the optical axis of the reflector, and
the single compact light source in said midbeam headlamp extends between said spaced focal points.

13. The vehicular tri-beam headlighting system of claim 12 wherein the lens of said mid-beam lamp has a plurality of flutes on its inner surface that extend vertically across the lens, and said flutes constitute the sole light-bending means associated with said lens.

14. The vehicular tri-beam headlighting system of claim 13 wherein;
said dual-function headlamps and said high-beam headlamp each have paraboloidal-shaped reflectors and prismatic type lenses, and
each of the lenses have a plurality of spaced outwardly-projecting pads on their outer surfaces that are oriented to permit the headlamps to be aimed by mechanical means.

15. The vehicular tri-beam headlighting system of claim 12 wherein each of said headlamps is fitted with a prismatic type lens that has a plurality of spaced projections on its outer surface which are oriented to permit the respective headlamps to be aimed by mechanical means.

16. The vehicular tri-beam headlighting system of claim 15 wherein each of said headlamps is of the sealed-beam type.

* * * * *